United States Patent
Li et al.

(10) Patent No.: US 11,635,646 B2
(45) Date of Patent: Apr. 25, 2023

(54) DETECTING DEVICE AND DETECTING METHOD THEREOF, AND DETECTING APPARATUS

(71) Applicants: FUZHOU BOE OPTOELECTRONICS TECHNOLOGY CO., LTD., Fujian (CN); BOE TECHNOLOGY GROUP CO., LTD., Beijing (CN)

(72) Inventors: Jian Li, Beijing (CN); Nianren Wang, Beijing (CN); Yang Liu, Beijing (CN); Xuehuan Song, Beijing (CN); Tao Wu, Beijing (CN); Jian Wang, Beijing (CN); Qi Zhang, Beijing (CN); Qi Xu, Beijing (CN)

(73) Assignees: FUZHOU BOE OPTOELECTRONICS TECHNOLOGY CO., LTD., Fujian (CN); BOE TECHNOLOGY GROUP CO., LTD., Beijing (CN)

(*) Notice: Subject to any disclaimer, the term of this patent is extended or adjusted under 35 U.S.C. 154(b) by 573 days.

(21) Appl. No.: 16/642,344

(22) PCT Filed: Jan. 14, 2019

(86) PCT No.: PCT/CN2019/071647
§ 371 (c)(1),
(2) Date: Feb. 26, 2020

(87) PCT Pub. No.: WO2019/214287
PCT Pub. Date: Nov. 14, 2019

(65) Prior Publication Data
US 2020/0264459 A1    Aug. 20, 2020

(30) Foreign Application Priority Data

May 9, 2018 (CN) .......................... 201810437048.7

(51) Int. Cl.
G02F 1/13     (2006.01)
G01N 21/95    (2006.01)
G09G 3/00     (2006.01)

(52) U.S. Cl.
CPC .................................. *G02F 1/1309* (2013.01)

(58) Field of Classification Search
CPC .................. G02F 1/1309; G01N 21/95; G01N 2021/9513; G09G 3/006
See application file for complete search history.

(56) References Cited

U.S. PATENT DOCUMENTS 7,808,630 B2   10/2010   Shin
8,223,333 B2    7/2012   Kim
(Continued)

FOREIGN PATENT DOCUMENTS

CN   101520558 B   6/2011
CN   101750770 B   9/2012
(Continued)

*Primary Examiner* — Seung C Sohn

(57) ABSTRACT

A detecting device and a detecting method thereof and a detecting apparatus are provided. The detecting device includes a stage, a light detection unit and a first, light, source, the stage includes a bearing surface for bearing an object to be detected, the light detection unit is located on a side of the stage, the first light source is located on a side of the stage that is opposite to the light detection unit, and light emitted from the, first light source is at least partially emitted to the light detection unit.

14 Claims, 2 Drawing Sheets

(56) References Cited

U.S. PATENT DOCUMENTS

2002/0005892 A1* 1/2002 Herre ................. G01N 21/8806
348/125
2007/0145308 A1* 6/2007 Kemp .................... B65G 43/02
250/559.08

FOREIGN PATENT DOCUMENTS

| CN | 104819985 A | 8/2015 |
| CN | 105784723 A | 7/2016 |
| CN | 105954900 A | 9/2016 |
| CN | 107084927 A | 8/2017 |
| CN | 108628015 A | 10/2018 |
| TW | 201333445 A | 8/2013 |

* cited by examiner

DETECTING DEVICE AND DETECTING METHOD THEREOF, AND DETECTING APPARATUS

The application is a U.S. National Stage of International Application No. PCT/CN2019/071647, filed Jan. 14, 2019, which claims priority to the Chinese patent application No. 201810437048.7, filed May 9, 2018, the disclosure of which is incorporated herein by reference as part of the application.

TECHNICAL FIELD

At least one embodiment of the present disclosure relates to a detecting device and a detecting method thereof, and a detecting apparatus.

BACKGROUND

Electronic display products, such as liquid crystal display panels, are prone to generate defects during a producing process. For example, in a cell-assembling process, air bubbles are apt to appear in the liquid crystal display panels. The above-described defects will affect a display effect of the liquid crystal display panels and reduce users' visual experience. Therefore, in an actual producing process, it is necessary to detect the liquid crystal display panels to ensure a yield of the liquid crystal display panels.

However, currently the devices and methods for detecting the yield of the liquid crystal display panels are very inefficient, and it is difficult to detect all the liquid crystal display panels produced, so that the yield of the ex-factory liquid crystal display panels still cannot be guaranteed.

SUMMARY

At least one embodiment of the present disclosure provides a detecting device, the detecting device comprises a stage, a light detection unit and a first light source, the stage includes a bearing surface for bearing an object to be detected, the light detection unit is located on a side of the stage, the first light source is located on a side of the stage that is opposite to the light detection unit, and light emitted from the first light source is at least partially emitted to the light detection unit.

For example, in the detecting device provided by at least one embodiment of the present disclosure, the light detection unit includes a light sensor array including a plurality of light sensors, the object to be detected includes a first illuminated region illuminated by the first light source; and an orthogonal projection of the light sensor array on a plane where the object to be detected is located at least partially overlaps with the first illuminated region.

For example, in the detecting device provided by at least one embodiment of the present disclosure, the orthogonal projection of the light sensor array on the plane where the object to be detected is located coincides with the first illuminated region.

For example, in the detecting device provided by at least one embodiment of the present disclosure, the orthogonal projection of the light sensor array on the plane where the object to be detected is located is located within the first illuminated region.

For example, in the detecting device provided by at least one embodiment of the present disclosure, the light detection unit further includes a signal detection unit being in signal connection with the light sensor array and configured to detect an electrical signal of the light sensor.

For example, the detecting device provided by at least one embodiment of the present disclosure further comprises a control module, the control module is in signal connection with the light detection unit and configured to judge whether there is a defective region in the object to be detected according to a detection result of the signal detection unit.

For example, in the detecting device provided by at least one embodiment of the present disclosure, the stage includes a first driving unit in signal connection with the control module; and the first driving unit is configured to drive the object to be detected to move along a first direction parallel to the bearing surface.

For example, in the detecting device provided by at least one embodiment of the present disclosure, in the light sensor array, a plurality of the light sensors are arranged in one row in a second direction; or a plurality of the light sensor arrays are arranged hi a plurality of rows in the second direction, and a plurality of columns in the first direction; the first direction and the second direction are parallel to the bearing surface, and the first direction and the second direction intersect with each other.

For example, in the detecting device provided by at least one embodiment of the present disclosure, the first direction is perpendicular to the second direction, and in the second direction, a size of the light sensor array is greater than or equal to a size of the object to be detected.

For example, the detecting device provided by at least one embodiment of the present disclosure further comprises an image acquisition unit located on a side of the object to be detected; and a second light source located. on a side of the object to be detected that is away from the image acquisition unit; the image acquisition unit is in signal connection with the control module; and light emitted by the second light source is at least partially emitted to the image acquisition unit.

For example, the detecting device provided by at least one embodiment of the present disclosure further comprises a second driving unit configured to fix the image acquisition unit and be in signal connection with the control module; the second driving unit is configured to drive the image acquisition unit to align with the defective region under control of the control module.

For example, the detecting device provided by at least one embodiment of the present disclosure further comprises the object to be detected is a panel to be detected, and the object to be detected is provided on the bearing surface of the stage.

At least one embodiment of the present disclosure provides a detecting apparatus comprising the detecting device according to any foregoing embodiment.

At least one embodiment of the present disclosure provides a detecting method of a detecting device, the detecting device comprises a stage, a light detection unit and a first light source, the stage includes a bearing surface for bearing an object to be detected; the light detection unit is located on a side of the object to be detected; the first light source is located on a side of the stage that is opposite to the light detection unit, light emitted from the first light source is at least partially emitted to the light detection unit; and the detecting method comprises: detecting the object to be detected by using light of the first light source emitted to the light detection unit.

For example, the detecting method provided by at least one embodiment of the present disclosure further comprises: placing the object to be detected on the bearing surface; and emitting light emitted by the first light source to the object to be detected.

For example, in the detecting method provided by at least one embodiment of the present disclosure, the detecting the object to be detected by using light of the first light source emitted to the light detection unit includes: detecting the object to be detected by using light of the first light source that is emitted to the light detection unit through the object to be detected.

For example, in the detecting method provided by at least one embodiment of the present disclosure, the detecting the object to be detected by using light of the first light source that is emitted to the light detection unit through the object to be detected includes: detecting, by the light detection unit, an intensity of light emergent from the object to be detected; and determining whether there is a defective region in the object to be detected according to a detection result.

For example, the detecting method provided by at least one embodiment of the present disclosure further comprises: moving the object to be detected, and repeating steps of: emitting light emitted by the first light source to the object to be detected; detecting, by the light detection unit, the intensity of light emergent from the object to be detected; and determining whether there is a defective region in the object to be detected according to the detection result, until detection of the object to be detected is completed.

For example, in the detecting method provided by at least one embodiment of the present disclosure, the light detection unit includes a light sensor array; the light sensor array includes a plurality of light sensors; and the light sensor is a photoresistor, the detecting, by the light detection unit, the intensity of light emergent from the object to be detected includes: detecting a resistance value of each of the plurality of photoresistors; the determining whether there is a defective region in the object to be detected according to the detection result includes: determining whether a resistance value of each of the photoresistors is an abnormal resistance value according to the detection result, to determine whether there is the defective region in the object to be detected.

For example, in the detecting method provided by at least one embodiment of the present disclosure, the determining whether a resistance value of each of the photoresistors is an abnormal resistance value according to the detection result to determine whether there is the defective region in the object to be detected includes: providing a first threshold range; determining that the photoresistor has an abnormal resistance value, when the resistance value is greater than the first threshold range or less than the first threshold range; and determining that a region corresponding to the photoresistor having the abnormal resistance value in the object to be detected is the defective region.

For example, in the detecting method provided by at least one embodiment of the present disclosure, the determining whether a resistance value of each of the photoresistors is an abnormal resistance value according to the detection result to determine whether there is the defective region in the object to be detected includes: determining that photoresistors in a first region have an abnormal resistance value, when resistance values of all of the photoresistors within the first region of the light sensor array are all greater than or all less than resistance values of photoresistors in other regions, and the number of the photoresistors in the first region is less than ½ of a total number of the photoresistors, and determining that a region of the object to be detected corresponding to the first region is the defective region.

For example, in the detecting method provided by at least one embodiment of the present disclosure, a difference between the resistance values of the photoresistors in the first region and the resistance values of the other photoresistors is not less than 3.2% of the resistance value of the other photoresistors.

For example, in the detecting method provided by at least one embodiment of the present disclosure, the object to be detected includes a display region and a non-display region, and the detecting a resistance value of the photoresistor includes: detecting a resistance value of the photoresistor corresponding to the display region, and shielding detection of a resistance value of the photoresistor corresponding to the non-display region.

For example, the detecting method provided by at least one embodiment of the present disclosure further comprises: acquiring a size and a position of the defective region in the object to be detected.

For example, in the detecting method provided by at least one embodiment of the present disclosure, the object to be detected moves along a first direction parallel to the bearing surface; the photoresistors are arranged along a second direction parallel to the bearing surface; the first direction and the second direction intersect with each other; and the acquiring a size and a position of the defective region in the object to be detected includes: determining a first coordinate of the defective region corresponding to the photoresistor having the abnormal resistance value in the object to be detected in the second direction, according to the photoresistor having the abnormal resistance value; determining a second coordinate of the corresponding defective region in the first direction, according to a moving speed of the object to be detected and a difference between a time when the corresponding defective region in the object to be detected is detected and a detection start time; determining a position of the corresponding defective region according to the first coordinate and the second coordinate, and determining the size of the corresponding defective region according to a projection area of the photoresistor having the abnormal resistance value on the object to be detected; the detecting method further comprises: counting sizes of all of the corresponding defective regions and determining positions of the corresponding defective regions, within a time period from start to end of the detection.

For example, the detecting method provided by at least one embodiment of the present disclosure further comprises: analyzing the resistance value of the photoresistor having the abnormal resistance value and the size of the defective region, to determine a type of the defect of the object to be detected.

For example, in the detecting method provided by at east one embodiment of the present disclosure, the object to be detected includes a liquid crystal layer; and types of the defect include solid foreign matter being doped in the liquid crystal layer, and the liquid crystal layer having a bubble.

For example, in the detecting method provided by at least one embodiment of the present disclosure, the detecting device further comprises an image acquisition unit and a second light source respectively provided on both sides of the object to be detected; light emitted by the second light source is at least partially emitted to the image acquisition unit; and the detecting method further comprises: emitting the light emitted by the second light source to the object to be detected; and moving the image acquisition unit to a position opposite to the defective region, to acquire an image of the defective region by using the image acquisition unit.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

Figure 1:
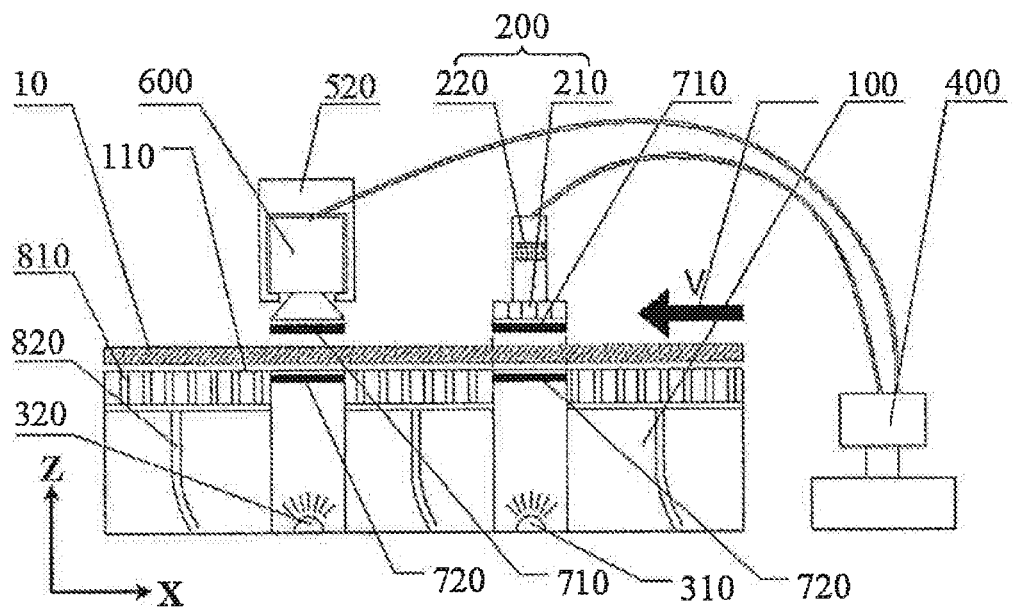
FIG. 1 is a structural schematic diagram of a detecting device provided by an embodiment of the present disclosure.

In order to make objects, technical details arid advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Unless otherwise defined, all the technical and scientific terms used herein have the same meanings as commonly understood by one of ordinary skill in the art to which the present disclosure belongs. The terms, such as "first," "second," or the like, which are used in the description and the claims of the present disclosure, are not intended to indicate any sequence, amount or importance, but for distinguishing various components. The terms, such as "comprise/comprising," "include/including," or the like are intended to specify that the elements or the objects stated before these terms encompass the elements or the objects and equivalents thereof listed after these terms, but not preclude other elements or objects. The terms, such as "connect/connecting/connected," "couple/coupling/coupled" or the like, are not limited to a physical connection or mechanical connection, but may include an electrical connection/coupling, directly or indirectly. The terms, "on," "under," "left," "right," or the like are only used to indicate relative position relationship, and when the position of the object which is described is changed, the relative position relationship may be changed accordingly.

During a detection process of a display panel, a quality of the display panel may be detected by means of manual visual detection manner. Such a detecting method requires a professional person to operate with a professional apparatus, and requires good judgment of the professional person, which, not only will increase costs of labor, but also will inevitably lead to missed detections; meanwhile, a long-term operation will cause damage to eyes of the professional person, etc.; in addition, manual detection has low efficiency, and only sampling detection can be performed, which makes it difficult to determine whether there is a defect in each display panel produced, so that it is difficult to improve a yield of the ex-factory display panel; furthermore, there are various types of defects of the display panel, which requires the professional person to make judgments according to specific situations, and it is difficult to quickly share information between detection professional persons, resulting in low efficiency of analyzing the types of defects.

At least one embodiment of the present disclosure provides a detecting device and a detecting method thereof, and a detecting apparatus. The detecting device comprises a stage, a light detection unit and a first light source; the stage includes a bearing surface for bearing an object to be detected; the light detection unit is located on a side of the object to be detected; the first light source is located on a side of the stage that is opposite to the light detection unit; light emitted from the first light source is at least partially emitted to the light detection unit. In the detecting device, the first light source emits light to the object to be detected and light transmitted through the object to be detected is received by the light detection unit, in this way, the light detection unit may detect distribution of light transmittances of the object to be detected, and accordingly may detect whether a defect occurs in the object to be detected. The detecting device can complete automatic detection of whether a defect occurs in the object to be detected without human intervention, to improve detection efficiency and reduce the cost. Thus, in an actual producing process, each produced product (e.g., a display panel) may be detected, to improve a yield of the ex-factory product. For example, the object to be detected is a panel to be detected, and during a detection process, the panel to be detected is placed on the bearing surface of the stage. When the panel to be detected is placed on the bearing surface, the first light source is located on a side of the panel to be detected away from the light detection unit.

In at least one embodiment of the present disclosure, a type of a panel to be detected will not be limited. For example, the panel to be detected may be a display panel, such as a liquid crystal display panel, an OLED display panel, and an electronic paper display panel. For example, the panel to be detected may also be a transparent or semitransparent member such as a touch panel, a package cover, or a bearing substrate. For example, in at least one embodiment of the present disclosure, being "transparent" or "semitransparent" refers to a member's capacity for transmitting light emitted by a first light source, and the light emitted by the first light source is not limited to visible light.

Hereinafter, by taking the panel to be detected as a liquid crystal display panel, a detecting device and a detecting method, and a detecting apparatus according to at least one embodiment of the present disclosure will be described in detail in conjunction with the accompanying drawings.

FIG. 1 is a structural schematic diagram of a detecting device provided by an embodiment of the present disclosure.

In at least one embodiment of the present disclosure, as shown in FIG. 1, the detecting device comprises a stage 100, a light detection unit 200 and a first light source 310. The stage 100 includes a bearing surface 110 for bearing a panel 10 to be detected; the light detection unit 200 is located on a side of the panel 10 to be detected; the first light source 310 is located on a side of the panel 10 to be detected that is away from the light detection unit 200; and light emitted from the first light source 310 is at least partially emitted to the light detection unit 200. With respect to a region of the panel 10 to be detected that is corresponding to the light detection unit 200 and the first light source 310, the light detection unit 200 may detect a light transmittance of the region, may further determine whether the light transmittance of the region is abnormal, and accordingly may determine whether a defect occurs in the region.

In at least one embodiment of the present disclosure, specific positions of a light detection unit and a first light source will not be limited, as long as the light detection unit and the first light source are respectively located on both sides of the panel to be detected. For example, in some embodiments of the present disclosure, as shown in FIG. 1, a light detection unit 200 is located on a side of a panel to be detected that is away from a stage 100, and a first light source 310 is located on a side of the panel to be detected that faces the stage 100. For example, the first light source 310 may be disposed in the stage 100. For example, in other embodiments of the present disclosure, a light detection unit may be located on a side of a panel to be detected that faces a stage, and a first light source may be located on a side of the panel to be detected that is away from the stage.

In at least one embodiment of the present disclosure, a spatial rectangular coordinate system is established by taking a bearing surface of a stage as a reference, to provide a directional description of positions of each member in a detecting device. Exemplarily, as shown in FIG. 1, an X axis and a Y axis (referring to FIG. 3) of the spatial rectangular coordinate system are parallel to a bearing surface 110, and a Z axis is perpendicular to the bearing surface 110. For example, a plane where a panel 10 to be detected is located and the bearing surface 110 of the stage 100 are parallel to each other. In addition, in at least one embodiment of the present disclosure, being "corresponding" may indicate that two portions coincide or partially overlap with each other in a Z-axis direction.

Figure 2:
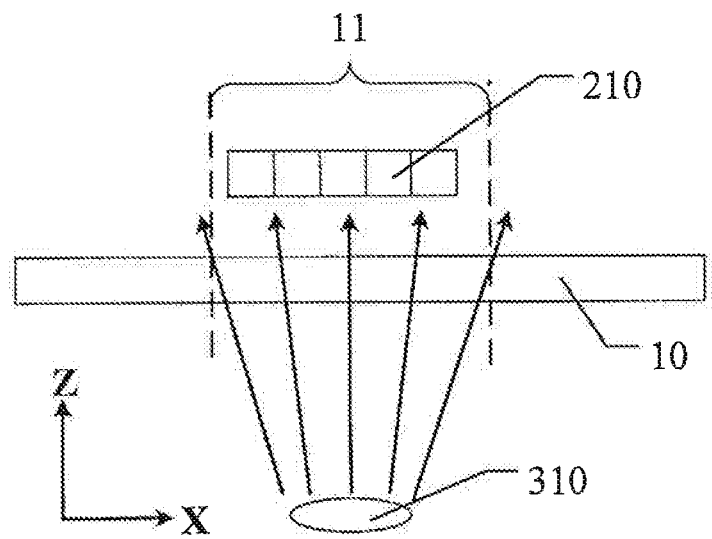
FIG. 2 is a schematic diagram of a portion of the structure of the detecting device shown in FIG. 1.

FIG. 2 is a schematic diagram of a portion of the structure of the detecting device shown in FIG. 1.

For example, in a detecting device provided by at least one embodiment of the present disclosure, a light detection unit includes a light sensor array. The light sensor array includes a plurality of light sensors; a panel to be detected includes a first illuminated region illuminated by a first light source; and an orthogonal projection of the light sensor array on a plane where the panel to be detected is located at least partially overlaps with the first illuminated region. Exemplarily, as shown in FIG. 1 and FIG. 2, a light detection unit 200 includes a light sensor array; and the light sensor array includes a plurality of light sensors 210. Each light sensor 210 may detect a light transmittance of a corresponding portion of a panel 10 to be detected; and the plurality of light sensors 210 provided may simultaneously detect a plurality of regions of the panel 10 to be detected, so as to improve detection efficiency. A region in the panel 10 to be detected that is illuminated by light emitted by a first light source 310 is a first illuminated region 11; an orthogonal projection of the light sensor array (the light sensor 210) on a plane where the panel 10 to be detected is located at least partially overlaps with the first illuminated region 11, so that the light sensor array (the light sensor 210) can receive the light emitted by the first light source 310, and thus, the light transmittance of the panel 10 to be detected can be detected.

For example, in at least one embodiment of the present disclosure, a light sensor may be a photoresistor. A resistance value of the photoresistor changes with an intensity of light being irradiated, so the resistance value of the photoresistor may reflect a light transmittance of a panel to be detected. For example, the resistance value of the photoresistor decreases with increase of the light intensity, and increases with decrease of the light intensity. For example, as compared with a normal region of the panel to be detected, a light transmittance of a defective region will increase or decrease; an intensity of light transmitted through the defective region will be greater than or less than a normal value; and accordingly, a resistance value of a photoresistor corresponding to the defective region will also be abnormal (greater than or less than a normal value). In at least one embodiment of the present disclosure, a material of a photoresistor will not be limited, as long as resistivity (a resistance value of the photoresistor) of the material may change with light intensity. For example, the material of the photoresistor may include cadmium sulfide, selenium, aluminum sulfide, lead sulfide, bismuth sulfide, or other similar material.

For example, in a detecting device provided by at least one embodiment of the present disclosure, an orthogonal projection of a light sensor array on a plane where a panel to be detected is located coincides with a first illuminated region; or the orthogonal projection of the light sensor array on the plane where the panel to be detected is located is located within the first illuminated region. Exemplarily, as shown in FIG. 1 and FIG. 2, in a Z-axis direction, an orthogonal projection of a light sensor array (the light sensor 210) on a plane where a panel 10 to be detected is located is located within a first illuminated region 11, and thus, all portions of the light sensor 210 can receive light emitted by a first light source 310, which may improve detection accuracy of the light sensor 210 and further improve a detection effect of the panel 10 to be detected.

For example, in a detecting device provided by at least one embodiment of the present disclosure, a light detection unit further includes a signal detection unit; and the signal detection unit is la signal connection with a light sensor array and is configured to detect an electrical signal of a light sensor. Exemplarily, as shown in FIG. 1, a light detection unit 200 includes a signal detection unit 220; and the signal detection unit 220 is in signal connection with a light sensor array (the light sensor 210). Taking a light sensor 210 as a photoresistor as an example, the signal detection unit 220 may convert a resistance value of the photoresistor that is used to reflect a light transmittance of a panel 10 to be detected into a corresponding electrical signal. In this way, whether there is a defect in the panel 10 to be detected may be determined by analyzing the electrical signal For example, a detecting device provided by at least one embodiment of the present disclosure further comprises a control module; and the control module is in signal connection with a light detection unit and is configured to judge whether there is a defective region in a panel to be detected according to a detection result of a signal detection unit. Exemplarily, as shown in FIG. 1, the detecting device comprises a control module 400 in signal connection with a light detection unit 200. The control module 400 may analyze an electrical signal sent by a signal detection unit 220 that reflects a light transmittance of a panel 10 to be detected, to determine whether there is a defect in the panel 10 to be detected; and the control module 400 determines information such as a position and a size of a defective region in the panel 10 to be detected according to an analysis result of the electrical signal, and may also control an operation of other device (e.g., an image acquisition unit according to an embodiment below) according to the analysis result.

In at least one embodiment of the present disclosure, a type of a control module will not be limited, as long as the control module can receive a signal, analyze data, and is capable of sending an instruction. For example, the control module may include a memory and a processor; the memory stores an instruction; and the processor is configured to operate under control of the instructions stored in the memory, so as to execute judgment of whether there is a defective region in a panel to be detected according to a detection result of a signal detection unit. Exemplarily, the control module may include a hardware circuit and a programmable hardware device, etc. The hardware circuit may include a conventional Very Large Scale Integration (VLSI) circuit or a gate array as well as existing semiconductors such as a logic chip and a transistor, or other discrete components; and the programmable hardware device may include a field programmable gate array, a programmable array logic, and a programmable logic device, etc.

Figure 3:
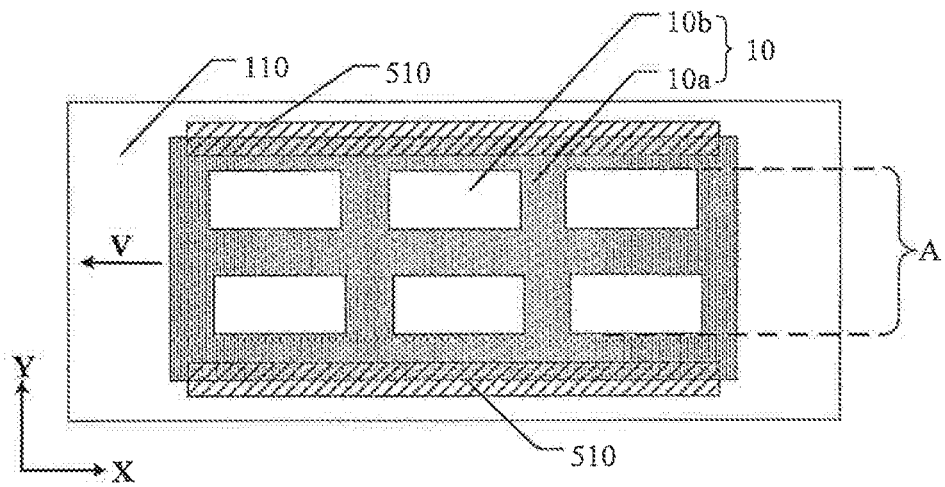
FIG. 3 is a plan view of a portion of the structure of the detecting device shown in FIG. 1.

FIG. 3 is a plan view of a portion of the structure of the detecting device shown in FIG. 1.

For example, in a detecting device provided by at least one embodiment of the present disclosure, a stage includes a first driving unit in signal connection with a control module; and the first driving unit is configured to drive a panel to be detected to move along a first direction parallel to a bearing surface. Exemplarily, as shown in FIG. 1 and FIG. 3, a stage 100 includes a first driving unit 510; and the first driving unit 510 drives a panel 10 to be detected to move along a first direction (a direction of an arrow indicated by V) parallel to a bearing surface 110. In this way, a light detection unit 200 may perform scanning detection on the panel 10 to be detected without moving a first light source 310 and the light detection unit 200, which simplifies the structure of the detecting device, For example, the first direction may be parallel to an X-axis.

Hereinafter, by taking the first direction as a negative direction of the X axis, a technical solution in at least one of the following embodiments of the present disclosure will be described.

For example, in at least one embodiment of the present disclosure, a first driving unit may include a clamping member to fix a panel to be detected, so as to drive the panel to be detected to move. For example, the clamping member may be a vacuum adsorption member, and the vacuum adsorption member may be provided on both sides of the panel to be detected so as to fix and drive the panel to be detected to move along a first direction. A vacuum adsorption hole may be provided in the clamping member, and a size (e.g., a diameter, a width and a length, etc.) of the vacuum adsorption hole may be 1 mm to 3 mm, for example, further 1.5 mm, 2 mm, or 2.5 mm, etc.; a pressure of the vacuum adsorption is less than an atmospheric pressure, for example, the pressure of vacuum adsorption relative to the atmospheric pressure may be −100 KPa to −50 KPa, for example, which is further −90 KPa, −85 KPa, −80 KPa, −75 KPa, −70 KPa, or −60 KPa, etc. For example, the first driving unit may include a ruler, and the ruler may be used to demarcate an initial position of the panel to be detected, and used to record a real-time position of the panel to be detected, which may assist a control module to determine a specific position of a defective region in the panel to be detected.

For example, in at least one embodiment of the present disclosure, an air floating structure may be provided in the stage to bear the panel to be detected. During a process that the first driving unit drives the panel to be detected, the air floating structure may suspend the panel to be detected, so as to reduce resistance when the panel to be detected moves, reduce a risk of being scratched during the moving process of the panel to be detected, increase a moving speed of the panel to be detected, and increase detection efficiency. Exemplarily, as shown in FIG. 1, an air floating structure may include an air flotation hole 810 and an air pipe 820 in communication with each other; the air flotation hole 810 is in communication with a bearing surface 110; and air input from the air pipe 820 to the air flotation hole 810 is ejected from the bearing surface 110, so that a panel 10 to be detected is suspended.

For example, a size of the air flotation hole may be 0.2 mm to 0.8 mm, for example, further 0.4 mm, 0.5 mm, or 0.6 mm, etc.; a separation distance between the air flotation holes may be set to 10 mm to 30 mm, for example, further 15 mm, 20 mm, or 30 mm, etc.; an air pressure value in the air flotation hole may be greater than an atmospheric pressure, for example, 200 KPa to 500 KPa, for example, further 250 KPa, 300 KPa, 340 KPa, 400 KPa, or 450 KPa, etc. The air ejected from the air flotation hole suspends the panel to be detected, and make the separation distance between the panel to be detected and the hearing surface be 0.2 mm to 0.8 mm, for example, further 0.4 mm, or 0.6 mm, etc. It should be noted that, a specific size of the air flotation hole, a separation distance between the air flotation holes, and an air pressure value in the air flotation hole may be set according to actual needs, which will not be limited in at least one embodiment of the present disclosure.

In at least one embodiment of the present disclosure, an arrangement of the light sensors in a light sensor array will not be limited, and the arrangement of the light sensors may be set according to a moving direction of the panel to be detected. For example, in a detecting device provided by at least one embodiment of the present disclosure, in the light sensor array, a plurality of light sensors are arranged into one row in a second direction; or a plurality of light sensor arrays are arranged into a plurality of rows in the second direction, and a plurality of columns in the first direction, wherein, the first direction and the second direction are parallel to a bearing surface, and the first direction and the second direction intersect with each other. In this way, in a process of performing scanning detection on the panel to be detected by using the plurality of light sensors, a scan width may be increased, so as to improve detection efficiency. Arranging a plurality of rows of light sensors along the second direction is equivalent to implementing multiple scans on the panel to be detected, which may improve detection accuracy and reduce an error.

For example, the light sensors located in different rows in the second direction may be staggered, such that errors caused by the size and an arrangement mode of the light sensors may be reduced, so as to further improve detection accuracy. A rectilinear coordinate is established by taking the second direction as a reference, the detection accuracy of the light detection unit is related to the number of the light sensors located at different coordinates of the rectilinear coordinate in the second direction: the larger the number of the light sensors having different coordinates, the higher the accuracy of the light detection unit. Because the light sensor has a certain volume, in the second direction, the number of the light sensors provided in each row is limited, that is, in a case where the light sensors located in different rows are not staggered, the number of the light sensors located at different coordinates of the linear coordinates is relatively small or even only equal to the number of the light sensors provided in each row, which limits detection accuracy of the light detection unit. In a case where the light sensors located in different rows are staggered with each other, the number of the light sensors located at different coordinates as included in the light detection unit will increase, and accordingly, detection accuracy of the light detection unit is also increased.

Exemplarily, in the second direction, the light sensors in the light detection unit are arranged into two rows in the second direction, and the light sensors in the first row and the second row are staggered with each other, that is, coordinates of the light sensors in the first row and coordinates of the light sensors in the second row in the above-described rectilinear coordinate system are alternately arranged. Because the light sensors in the first row are arranged at intervals and the light sensors have a certain size, a light transmittance of a region of the panel to be detected that corresponds to an interval region and an edge portion of the light sensors in the first row cannot be detected by the light sensors in the first row, but the light transmittance of the region can be detected by the light sensors in the second row. In this way, as compared with a case where only one row of light sensors are provided in the light detection unit or the light sensors in the first row and second row are not staggered, in the case where the light sensors in the first row and the second row are staggered, detection accuracy of the light detection unit may be doubled.

For example, in at least one embodiment of the present disclosure, the second direction may be perpendicular to the first direction. Exemplarily, in a spatial rectangular coordinate system, when the first direction is a negative direction of an X-axis, the second direction is parallel to a Y-axis, which, thus, may reduce the number of the light sensors and reduce costs, while maintaining a scan width of the light sensor array in the second direction.

In at least one embodiment of the present disclosure, a size of the light sensor will not be limited. For example, taking the light sensor as the photoresistor, a size of the photoresistor may be set to 0.5 mm to 2 mm, for example, which is further 0.8 mm, 1 mm, 1.2 mm, or 1.5 mm, etc. The smaller the size of the photoresistor, the more photoresistors can he arranged in the second direction, which increases density for arranging the photoresistors, so as to improving detection accuracy.

For example, in a detecting device provided by at least one embodiment of the present disclosure, in the second direction, a size of the light sensor array is larger than or equal to a size of the panel to be detected in the direction. In this way, the light sensors in the light sensor array complete detection of the entire panel to be detected by only a single scanning, so as to improve detection efficiency. It should be noted that, as shown in FIG. 3, a panel 10 to be detected may comprise a display region 10b and a non-display region 10a; the display region 10b is used to display an image; the non-display region 10a may include a dummy region, a circuit region and the like; and the dummy region may be removed in a subsequent cutting process. In the above-described case, when comparing a relationship between the size of the light sensor array and the size of the panel to be detected, the non-display region 10a located at an edge of the panel 10 to be detected is not counted into the size of the panel 10 to be detected, that is, the size of the panel 10 to be detected that is used for comparison may be a size of a region A in the second direction.

For example, in at least one embodiment of the present disclosure, a signal detection unit in a light detection unit may be configured to detect a resistance value of a photoresistor corresponding to a display region, and shield detection of a resistance value of a photoresistor corresponding to a non-display region. In this way, it is only necessary to detect a light transmittance of the display region, which may eliminate problems such as an error caused by a difference in the light transmittances between the non-display region and the display region or complicate data analysis, reduce difficulties in analysis and calculation performed by a control module on an electrical signal input from the signal detection unit, and improve accuracy of a calculation result (data reflecting a position and a size, etc. of a defective region) of the control module.

For example, the detecting device provided by at least one embodiment of the present disclosure further comprises an image acquisition unit and a second light source; the image acquisition unit is located on a side of the panel to be detected; the second light source is located on a side of the panel to be detected that is away from the image acquisition unit; the image acquisition unit is in signal connection with the control module; and light emitted by the second light source is at least partially emitted to the image acquisition unit. For example, the image acquisition unit and the light detection unit may be located on a same side of the panel to be detected. Exemplarily, as shown in FIG. 1, an image acquisition unit 600 is located on a side of a panel 10 to be detected; a second light source 320 is located on a side of the panel 10 to be detected that is away from the image acquisition unit 600; the image acquisition unit 600 is in signal connection with the control module 400; and light emitted by the second light source 320 is at least partially emitted to the image acquisition unit 600. The image acquisition unit 600 may acquire an image reflecting light transmittance distribution of the panel 10 to be detected, and the image may be uploaded through the control module, so as to analyze and store the image. In this way, a remote operator may judge the image, so as to further determine whether a defect occurs in the panel to be detected or judge a type of the defect. For example, the image acquisition unit 600 may be a device such as a video camera that can acquire an images or a video.

For example, in at least one embodiment of the present disclosure, light emission brightness of the second light source is equal to light emission brightness of the first light source. In this way, a transmittance of the panel to be detected reflected by image data acquired by the image acquisition unit is the same as a transmittance of the panel to be detected reflected by signal data detected by the light detection unit, which is favorable for an operator to further analyze the image data and improve accuracy of judgment of a defect of the panel to be detected (whether it is defective, and a type of the defect, etc.).

For example, a detecting device provided by at least one embodiment of the present disclosure further comprises a second driving unit, configured to fix the image acquisition unit and be in signal connection with the control module; and the second driving unit is configured to drive the image acquisition unit to align with the defective region under control of the control module. Exemplarily, as shown in FIG. 1, a second driving unit 520 is in signal connection with the control module 400 and may drive the image acquisition unit 600 to move. After analyzing data detected by the light detection unit 200, the control module 400 may determine a position of a defective region on the panel 10 to be detected, and thus, the control module 400 controls the second driving unit 520 to move so as to move the image acquisition unit 600 to a position corresponding to the defective region, thereby acquiring an image of the defective region. In this way, the image acquisition unit 600 may acquire only the image of the defective region, which reduces the amount of data input to the control module 400, and reduces workload of a remote operator, without analyzing the all images related to the panel to be detected having a defect, which improves detection efficiency.

For example, in at least one embodiment of the present disclosure, in a case where the panel to be detected may be a liquid crystal display panel, polarizers may be provided on both sides of the panel to be detected, so that it can be prejudged whether the liquid crystal display panel will still has a defect after the polarizers are mounted. Exemplarily, as shown in FIG. 1, a first polarizer 710 is provided between the light detection unit 200 and the panel 10 to be detected, and between the image acquisition unit 600 and the panel 10 to be detected; and a second polarizer 720 is provided between the first light source 310 and the panel 10 to be detected, and between the second light source 320 and the panel 10 to be detected. A polarization direction of the first polarizer 710 and a polarization direction of the second polarizer 720 may be the same or different from each other. An alignment layer is provided in the liquid crystal display panel to pre-align liquid crystal molecules in the liquid crystal layer; the first polarizer 710 and the second polarizer 720 may be used to detect whether pre-alignment is uniformly distributed, so as to determine whether there is poor display in actual application of the liquid crystal display panel. For example, the polarization direction of the first polarizer 710 and the polarization direction of the second polarizer 720 are different from each other, and an included angle may be set to 30 degrees, 45 degrees, or 60 degrees, etc.

At least one embodiment of the present disclosure provides a detecting apparatus, comprising the detecting device according to any one of the foregoing embodiments. For example, the detecting apparatus may be provided with an input unit and an output unit, and the input unit and the output unit may put the panel to be detected into the detecting device or take out the panel to be detected from the detecting device. For example, the output unit may be connected with the control module of the detecting device; when it is determined that there is a defect in the panel to be detected, the panel to be detected is stored in a specific region (e.g., a storage device) for further detection by a professional person; and when it is determined that there is no defect in the panel to be detected, the panel to be detected is input into a downstream device.

At least one embodiment of the present disclosure provides a detecting method of a detecting device, wherein, the detecting device comprises a stage, a light detection unit and a first light source; the stage includes a bearing surface for bearing an object to be detected; the light detection unit is located on a side of the object to be detected; the first light source is located on a side of the object to be detected that is away from the light detection unit; light emitted by the first light source is at least partially emitted to the light detection unit; and the detecting method comprises: detecting the object to be detected by using light of the first light source emitted to the light detection unit. For example, the object to be detected is a panel to be detected.

In the detecting method, a light transmittance of the panel to be detected may be detected by using the light detection unit, and accordingly, whether a defect occurs in the panel to be detected may be detected. In the detecting method, automatic detection of whether the panel to be detected is defective may be completed without human intervention, which improves detection efficiency, and reduces the cost. In this way, in an actual producing process, each produced product (e.g., a display panel) may be detected, to improve a yield of the ex-factory product.

For example, the detecting method provided by at least one embodiment of the present disclosure further comprises: placing the panel to be detected on the bearing surface; and emitting light emitted by the first light source to the panel to be detected. For example, in the detecting method provided by at least one embodiment of the present disclosure, the detecting the panel to be detected by using light emitted by the first light source to the light detection unit includes: detecting the panel to be detected by using light of the first light source that is emitted to the light detection unit through the panel to be detected. For example, in the detecting method provided by at least one embodiment of the present disclosure, the detecting the panel to be detected by using light of the first light source that is emitted to the light detection unit through the panel to be detected includes: detecting, by the light detection unit, an intensity of light emergent from the panel to be detected; and determining whether there is a defective region in the panel to be detected according to a detection result. According to the above-described detecting method, whether a defect occurs in the panel to be detected may be detected accordingly.

For example, the detecting method provided by at least one embodiment of the present disclosure comprises moving the panel to be detected, and repeating steps of: emitting light emitted by the first light source to the panel to be detected; detecting, by the light detection unit, an intensity of light emergent from the panel to be detected; and determining whether there is a defective region in the panel to be detected according to a detection result, until the detection of the panel to be detected is completed. In this way, the light detection unit may perform scanning detection on the panel to be detected only by moving the panel to be detected, which simplifies a structure of a detecting device, and accordingly, also simplifies an operation process of the detecting method.

For example, in the detecting method provided by at least one embodiment of the present disclosure, the light detection unit includes a light sensor array; the light sensor array includes a plurality of light sensors; the light sensor is a photoresistor; the detecting, by the light detection unit, an intensity of light emergent from the panel to be detected includes: detecting a resistance value of each of the plurality of photoresistors; and the determining whether there is a defective region in the panel to be detected according to a detection result includes; determining whether a resistance value of each photoresistor is an abnormal resistance value according to the detection result, to determine whether there is a defective region in the panel to be detected. In this way, according to analysis of the resistance value of the photoresistor, if there is an abnormal resistance value in the photoresistor, there is a defective region in the panel to be detected.

In at least one embodiment of the present disclosure, a specific method for determining whether a photoresistor has an abnormal resistance value will not be limited, and may be designed according to an actual process.

For example, in the detecting method provided by at least one embodiment of the present disclosure, the determining whether the resistance value of each photoresistor is an abnormal resistance value according to the detection result to determine whether there is a defective region in the panel to be detected includes: providing a first threshold range; determining that the photoresistor has an abnormal resistance value, when the resistance value is greater than the first threshold range or less than the first threshold range; and determining that a region corresponding to the photoresistor having the abnormal resistance value in the panel to be detected is a defective region. For example, the first threshold range indicates a resistance value of the photoresistor when there is no defect in the panel to be detected; and the first threshold range may be a fixed resistance value, or may also be a floating value by taking a fixed resistance value as a reference. Exemplarily, a numerical interval of the first threshold range is [A, B], and a resistance value of the photoresistor corresponding to a normal region of the panel to be detected (without any defect) is between A and B; during a detection process, if the resistance value of the photoresistor is less than A or greater than B, then the photoresistor has an abnormal resistance value, and accordingly, whether there is a defective region in the panel to be detected may be determined.

For example, in the detecting method provided by at least one embodiment of the present disclosure, the determining whether a resistance value of each photoresistor is an abnormal resistance value according to the detection result to determine whether there is a defective region in the panel to be detected includes: determining that a plurality of photoresistors adjacent to each other have abnormal resistance values, when a difference between the resistance value of the plurality of photoresistors adjacent to each other and a resistance value of other photoresistors is within a certain range, and the number of the plurality of photoresistors adjacent to each other is less than ½ of the total number of photoresistors, and determining that a region of the panel to be detected that corresponds to the plurality of photoresistors adjacent to each other is a defective region. For example, when resistance values of all photoresistors within a first region of the light sensor array are all greater than or all less than resistance values of photoresistors in other regions, and the number of the photoresistors in the first region is less than ½ of the total number of the photoresistors, it is determined that the photoresistors in the first region have an abnormal resistance value, and it is determined that a region of an object to be detected that corresponds to the first region is a defective region. For example, the first region is a continuous region or includes a plurality of scattered sub-regions. In the panel to be detected, an area occupied by the defective region is usually relatively small; and accordingly, in a case where there is a defective region in the panel to be detected, the number of the photoresistors having the abnormal resistance value accounts for less than ½ of all the photoresistors. In this way, it is only necessary to compare the resistance values of the photoresistors, and the photoresistors having a different resistance value and having a smaller number (for example, less than ½ of the total number of the photoresistors) are determined to have an abnormal resistance value, and accordingly, whether there is a defective region in the panel to be detected may be determined.

For example, in the detecting method provided by at least one embodiment of the present disclosure, a difference between a resistance value of the photoresistors in a first region and a resistance value of other photoresistors is not less than 3.2% of the resistance value of the other photoresistors. For example, in a case where there is no defect occurring in a panel, a photoresistor has a first resistance value under a lighting condition; during a detecting process, if a resistance value of a photoresistor is less than or equal to 96.8% of the first resistance value or greater than or equal to 113.2% of the first resistance value, then it is determined that the photoresistor has an abnormal resistance value, and that a region of the object to be detected that corresponds to the photoresistor is a defective region.

For example, in the detecting method provided by at least one embodiment of the present disclosure, the panel to be detected includes a display region and a non-display region; and the detecting a resistance value of a photoresistor includes: detecting a resistance value of a photoresistor corresponding to the display region, and shielding detection of a resistance value of a photoresistor corresponding to the non-display region. In this way, it is only necessary to detect a light transmittance of the display region, which may eliminate problems such as an error caused by a difference in the light transmittances between the non-display region and the display region or complicate data analysis, reduce difficulty of data analysis, and improve accuracy of a detecting result.

For example, the detecting method provided by at least one embodiment of the present disclosure further comprises: acquiring a size and a position of a defective region in the panel to be detected, which thus, may help further analyze the defective region in a subsequent process; for example, an image of the defective region may be. acquired by using an image acquisition unit, for further analysis by a remote operator; and accordingly, a type of the defect in the panel to be detected may also be judged.

For example, in the detecting method provided by at least one embodiment of the present disclosure, the panel to be detected moves along a first direction parallel to a bearing surface; photoresistors are arranged along a second direction parallel to the bearing surface; the first direction and the second direction intersect with each other; and the acquiring a size and a position of a defective region in a panel to be detected includes: determining a first coordinate of a defective region corresponding to a photoresistor having an abnormal resistance value in the panel to be detected in the second direction, according to the photoresistor having the abnormal resistance value; determining a second coordinate of the corresponding defective region in the first direction, according to a moving speed of the panel to be detected and a difference between time when the corresponding defective region in the panel to be detected is detected and a detection start time; determining a position of the corresponding defective region according to the first coordinate and the second coordinate, and determining a size of the corresponding defective region according to a projection area of the photoresistor having the abnormal resistance value on the panel to be detected. For example, the detecting method further comprises counting sizes of all corresponding defective regions and determining positions thereof, within a time period from start to end of the detection.

For example, the first direction is a negative direction of an X-axis, and the second direction is parallel to a Y-axis; when the detection is started, an initial coordinate of the panel to be detected is determined; and dining the detecting process, the panel to be detected may move at a constant speed. In this way, relative coordinates of the photoresistor having the abnormal resistance value and the panel to be detected may be determined according to the detection start time and the moving speed of the panel to be detected, and accordingly, the position of the defective region in the panel to be detected may be determined. After the detection is completed, distribution of defective regions on the panel to be detected may be determined by counting coordinates of all defective regions on the panel to be detected. It should be noted that, a size of each defective region is related to accuracy of a light detection unit (e.g., a size of the photoresistor). Without considering the size of the photoresistor, each defective region represents only one coordinate point, and thus, after the defective regions are counted, an area defined by all the defective regions whose coordinate points are adjacent to each other may indicate a portion being defective in the panel to be detected.

For example, the detecting method provided by at least one embodiment of the present disclosure further comprises analyzing a resistance value of a photoresistor having an abnormal resistance value and a size of a defective region, to determine a type of a defect of a panel to be detected. By taking the panel to be detected being a liquid crystal display panel as an example, if a liquid crystal layer is doped with foreign matter (e.g., solid foreign matter such as a particle), a light transmittance of the region will decrease, and accordingly, a resistance value of a photoresistor corresponding to the region will increase; if a bubble (e.g., a nitrogen bubble or a vacuum bubble) is mixed in the liquid crystal layer, the light transmittance of the region will increase, and accordingly, a resistance value of a photoresistor corresponding to the region will decrease. It should be noted that, a specific type of the defect needs to be judged according to an actual situation of a detecting device; a relationship between types of defects and changes in the photoresistor in the previous detecting process may need to be accumulated; and corresponding data is recorded and stored as a basis for judging a type of a defect in a subsequent detecting process.

For example, in the detecting method provided by at least one embodiment of the present disclosure, a detecting device further comprises an image acquisition unit and a second light source respectively provided on both sides of a panel to be detected; light emitted by the second light source is at least partially emitted to the image acquisition unit; and the detecting method further comprises: emitting the light emitted by the second light source to the panel to be detected; and moving the image acquisition unit to a position opposite to a defective region, to acquire an image of the defective region by using the image acquisition unit. An image of the defective region may be acquired by using the image acquisition unit, and a remote operator may judge the image to further determine whether a defect occurs in the panel to be detected or judge the type of the defect.

It should be noted that, in the detecting method of the detecting device provided by at least one embodiment of the present disclosure, related contents in the foregoing embodiments (e.g., the embodiments of the structure of the detecting device shown in FIG. 1 to FIG. 3) may be referred to for a specific structure of the detecting device, and no detailed will be repeated here.

Figure 4:
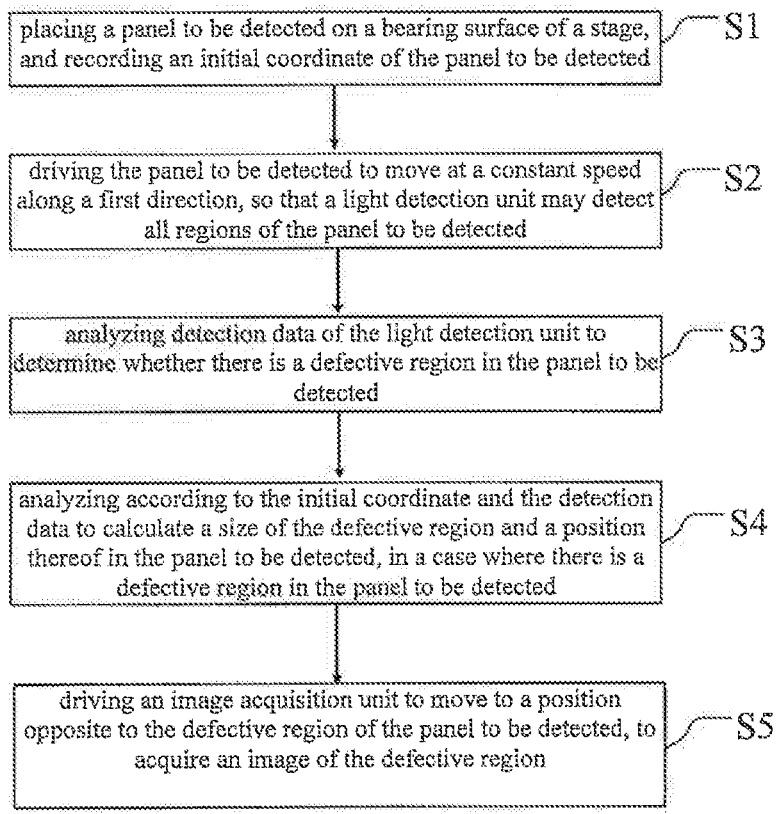
FIG. 4 is a flow chart of a detecting method of a detecting device provided by an embodiment of the present disclosure.

FIG. 4 is a flow chart of a detecting method of a detecting device provided by an embodiment of the present disclosure. Hereinafter, in at least one embodiment of the present disclosure, in combination with the detecting device shown in FIG. 1, as shown in FIG. 4, the detecting method of the detecting device may comprises steps below.

S1; placing a panel to be detected on a bearing surface of a stage, and recording an initial coordinate of the panel to be detected. For example, the initial coordinate may be a coordinate in a plane rectangular coordinate system established by taking the panel to be detected as a reference, and coordinate axes of the plane rectangular coordinate system may be an X axis and a Y axis of the spatial rectangular coordinate system according to the foregoing embodiment.

S2: driving the panel to be detected to move at a constant speed along a first direction, so that a light detection unit may detect all regions of the panel to be detected. For example, the first direction is a negative direction of the X-axis.

S3: analyzing detection data of the light detection unit to determine whether there is a defective region in the panel to be detected.

S4: analyzing according to the initial coordinate and the detection data to calculate a size of the defective region and a position thereof in the panel to be detected, in a case where there is a defective region in the panel to be detected.

Related description in the foregoing embodiments (the embodiments of the detecting method of the detecting device) may be referred to for the method for judging whether there is a defective region in the panel to be detected and determining the size and the position of the defective region, and no detailed will be repeated here.

S5: driving an image acquisition unit to move to a position opposite to the defective region of the panel to be detected, to acquire an image of the defective region. The image of the defective region may be uploaded to a remote end for an operator to identify the defective region as well as further judge and analyze a type of the defect.

At least one embodiment of the present disclosure provides a detecting device and a detecting method thereof, and a detecting apparatus, and may have at least one advantageous effect below:

(1) In a detecting device provided by at least one embodiment of the present disclosure, a light detection unit may detect distribution of light transmittances of a panel to be detected, and accordingly, may detect whether a defect occurs in the panel to be detected, in this way, the detecting device can complete automatic detection of whether the panel to be detected is defective without human intervention, to improve detection efficiency, and reduce costs.

(2) In a detecting device provided by at least one embodiment of the present disclosure, each produced product (e.g., a display panel) may be detected to improve a yield of the ex-factory product.

With respect to the present disclosure, several points below need to be explained:

(1) The drawings of the embodiments of the present disclosure relate only to the structures involved in the embodiments of the present disclosure, and normal designs may be referred to for other structures.

(2) For the sake of clarity, in the drawings used for describing the embodiments of the present disclosure, thicknesses of layers or regions are enlarged or reduced, that is, these drawings are not drawn in an actual scale.

(3) In case of no conflict, the embodiments of the present disclosure and the features in the embodiments may be combined with each other to obtain a new embodiment.

The above are only specific embodiments of the present disclosure, but the scope of the embodiment of the present disclosure is not limited thereto, and the scope of the present disclosure should be the scope of the following claims.

The invention claimed is:

1. A detecting device, comprising:
a stage, including a bearing surface for bearing an object to be detected;
a light detection unit, located on a side of the stage;
a first light source, located on a side of the stage that is opposite to the light detection unit,
wherein light emitted from the first ht source is at least partially emitted to the light detection unit,
wherein the light detection unit includes:
a light sensor array, including a plurality of light sensors, each of the plurality of light sensors is a photoresistor;
the object to be detected includes a first illuminated region illuminated by the first light source; and an orthogonal projection of the light sensor array on a plane where the object to be detected is located at least partially overlaps with the first illuminated region;
wherein the light detection unit further includes:
a signal detection unit, being in signal connection with the light sensor array and configured to detect a resistance value of each of the plurality of photoresistors, to detect an intensity of light emergent from the object to be detected,
wherein the detection device further comprises:
a control module, being in signal connection with the light detection unit and configured to judge whether there is a defective region in the object to be detected according to a detection result of the signal detection unit,
wherein the control module is configured to judge whether a resistance value of each of the photoresistors is an abnormal resistance value according to the detection result, to determine whether there is the defective region in the object to be detected.

2. The detecting device according to claim 1, wherein the orthogonal projection of the light sensor array on the plane where the object to be detected is located coincides with the first illuminated region, or
the orthogonal projection of the light sensor array on the plane where the object to be detected is located is located within the first illuminated region.

3. The detecting device according to claim 1, wherein,
the stage includes a first driving unit in signal connection with the control module;
and the first driving unit is configured to drive the object to be detected to move along a first direction parallel to the bearing surface.

4. The detecting device according to claim 3, wherein in the light sensor array,
a plurality of the light sensors are arranged in one row in a second direction; or
a plurality of the light sensor arrays are arranged in a plurality of rows in the second direction, and a plurality of columns in the first direction;
the first direction and the second direction are parallel to the bearing surface, and the first direction and the second direction intersect with each other.

5. The detecting device according to claim 4, wherein,
the first direction is perpendicular to the second direction, and
in the second direction, a size of the light sensor array is greater than or equal to a size of the object to be detected.

6. The detecting device according to claim 1, further comprising:
an image acquisition unit, located on a side of the object to be detected;
a second light source, located on a side of the object to be detected that is away from the image acquisition unit;
wherein the image acquisition unit is in signal connection with the control module;
and light emitted by the second light source is at least partially emitted to the image acquisition unit.

7. The detecting device according to claim 6, further comprising:
a second driving unit, configured to fix the image acquisition unit and be in signal connection with the control module;
wherein the second driving unit is configured to drive the image acquisition unit to align with the defective region under control of the control module.

8. The detecting device according to claim 1, wherein,
the object to be detected is a panel to be detected, and the object to be detected is provided on the bearing surface of the stage.

9. A detecting apparatus, comprising the detecting device according to claim 1.

10. A detecting method of a detecting device, wherein the detecting device comprises:
a stage, including a bearing surface for bearing an object to be detected;
a light detection unit, located on a side of the object to be detected;
a first light source, located on a side of the stage that is opposite to the light detection unit, light emitted from the first light source being at least partially emitted to the light detection unit; and
the detecting method comprises:
detecting the object to be detected by using light of the first light source emitted to the light detection unit,
wherein the detecting the object to be detected by using light of the first light source emitted to the light detection unit includes: detecting the object to be detected by using light of the first light source that is emitted to the light detection unit through the object to be detected,
wherein the detecting the object to be detected by using light of the first light source that is emitted to the light detection unit through the object to be detected includes:
detecting, by the light detection unit, an intensity of light emergent from the object to be detected; and
determining whether there is a defective region in the object to be detected according to a detection result,
wherein the light detection unit includes a light sensor array; the light sensor array includes a plurality of light sensors; and the light sensor is a photoresistor,
the detecting, by the light detection unit, the intensity of light emergent from the object to be detected includes:
detecting a resistance value of each of the plurality of photoresistors;
the determining whether there is a defective region in the object to be detected according to the detection result includes:
determining whether a resistance value of each of the photoresistors is an abnormal resistance value according to the detection result, to determine whether there is the defective region in the object to be detected.

11. The detecting method according to claim 10, comprising:
moving the object to be detected, and repeating steps of: emitting light emitted by the first light source to the object to be detected; detecting, by the light detection unit, the intensity of light emergent from the object to be detected; and determining whether there is a defective region in the object to be detected according to the detection result,
until detection of the object to be detected is completed.

12. The detecting method according to claim 10, wherein the determining whether a resistance value of each of the photoresistors is an abnormal resistance value according to the detection result to determine whether there is the defective region in the object to be detected includes:
providing a first threshold range;
determining that the photoresistor has an abnormal resistance value, when the resistance value is greater than the first threshold range or less than the first threshold range; and
determining that a region corresponding to the photoresistor having the abnormal resistance value in the object to be detected is the defective region.

13. The detecting method according to claim 10, wherein the determining whether a resistance value of each of the photoresistors is an abnormal resistance value according to the detection result to determine whether there is the defective region in the object to be detected includes:
determining that photoresistors in a first region have an abnormal resistance value, when resistance values of all of the photoresistors within the first region of the light sensor array are all greater than or all less than resistance values of photoresistors in other regions, and the number of the photoresistors in the first region is less than ½ of a total number of the photoresistors, and determining that a region of the object to be detected corresponding to the first region is the defective region.

14. The detecting method according to claim 13, wherein,
a difference between the resistance values of the photoresistors in the first region and the resistance values of the other photoresistors is not less than 3.2% of the resistance value of the other photoresistors.

\* \* \* \* \*